United States Patent [19]

Schneider

[11] 4,282,040

[45] Aug. 4, 1981

[54] MONOOLEFINIC PLASTICIZED SULFUR

[75] Inventor: Ronald A. Schneider, Albany, Calif.

[73] Assignee: Chevron Research Company, San Francisco, Calif.

[21] Appl. No.: 130,779

[22] Filed: Mar. 17, 1980

Related U.S. Application Data

[63] Continuation-in-part of Ser. No. 952,526, Oct. 18, 1978, abandoned, which is a continuation of Ser. No. 718,236, Aug. 27, 1976, abandoned.

[51] Int. Cl.$^3$ .......................... C01B 17/00; C09K 3/00
[52] U.S. Cl. ................................................. 106/287.32
[58] Field of Search ............................. 106/287.32, 70

[56] References Cited

U.S. PATENT DOCUMENTS

| | | | |
|---|---|---|---|
| 3,465,064 | 9/1969 | Signouret | 106/287.32 |
| 4,026,719 | 5/1977 | Simic | 106/287.32 |

*Primary Examiner*—Allan Lieberman
*Attorney, Agent, or Firm*—D. A. Newell; T. G. DeJonghe; L. S. Squires

[57] ABSTRACT

A plasticized sulfur composition comprising at least 75 weight percent sulfur, 0.2 to 5 weight percent of an essentially linear alpha-olefin having 6 to 14 carbon atoms as sulfur plasticizer, and 5 to 20 weight percent of a solid filler.

10 Claims, No Drawings

MONOOLEFINIC PLASTICIZED SULFUR

CROSS-REFERENCE TO RELATED APPLICATIONS

This is a continuation-in-part of application Ser. No. 952,526, filed Oct. 18, 1978, and now abandoned which in turn is a continuation of application Ser. No. 718,236, filed Aug. 27, 1976, now abandoned.

BACKGROUND OF THE INVENTION

The present invention relates to a plasticized sulfur composition, which composition is useful for coating walls or other surfaces to form an acid- or corrosion-resistant surface which is resistant to cracking upon exposure to fluctuating temperatures.

Plasticized sulfur mixtures are disclosed in various references. For example, J. I. Jin gives the following tabular comparison of plasticized sulfur compositions in his report given at the ACS Los Angeles meeting, Symposium on New Sulfur Chemistry, Apr. 19, 1974, page 235:

COMPARISON OF PLASTICIZED SULFUR COMPOSITIONS

| Plasticizer | Melt Viscosity Regulator | Reference |
|---|---|---|
| Mixture of dithio and higher thiols | Chlorinated Polyphenyls | (2) |
| Arylenepolysulfide (ZM-399)* and aliphatic polysulfide (LP-3)** | None | (3,6) |
| $H-(SCH_2CH(OH)-CH_2S)_n-H$ and styrene | Diphenyl dithiophosphate | (4) |
| Dithiol | Monomercaptan | (5) |

*Thiokol's styrene polysulfide
**Thiokol's liquid polysulfide
(2) Louthan, R. P., U.S. Pat. No. 3,434,852 (March 1969).
(3) Barnes, M. D., U.S. Pat. No. 3,316,115 (April 1967).
(4) Signouret, J. B., U.S. Pat. No. 3,560,451 (February 1971).
(5) Kane, J. C., U.S. Pat. No. 3,447,941 (June 1969).
(6) Dale, J. M., Report No. 1 (Sept. 1961); Report No. 2 (April 1962); Report No. 3 (June 1963), Project 1092-2, Southwest Research Institute.

In "New Uses of Sulfur", James R. West, Editor, Advances in Chemistry Series 140, ACS, Washington, D.C., 1975, B. R. Currell et al describe various sulfur plasticizers in their report titled "plasticization of Sulfur". The report gives a study of the chemical interaction of additives (such as polymeric polysulfides, unsaturated hydrocarbons and phenolic derivatives) with sulfur and also measurement, using differential scanning calorimetry and electron microscopy, of the rate of crystallization of sulfur in the presence of these additives. Limonene, myrcene, dicyclopentadiene and cycloocta-1,3-diene were found particularly effective in retarding sulfur crystallization.

British Pat. No. 1,182,171 describes plasticization of sulfur using a dithio polysulfide, an olefin polymer, and an ethylenically unsaturated compound wherein the above constituents are heated and mixed with sulfur at a temperature between 100° and 200° C. to form a homogeneous plastic. The dithio polysulfide used was of the formula

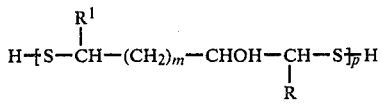

The dithio polysulfide was referred to in the British patent as an $R_s$ resin.

The British patent teaches that the dithio compound is necessary in order to secure reaction of the olefin polymer and the ethylenically unsaturated compound with the sulfur. Thus, the British patent states on page 2:
"The use of the resin $R_s$ is thus necessary for the reaction with the olefine polymer and optionally a monomeric ethylenically unsaturated compound."

Although certain olefinic hydrocarbons are well known as plasticizers for sulfur, the ones that have been used have been almost exclusively polyolefinic except for styrene, which has a double bond peculiarly activated by conjugation with the aromatic ring. The most preferred olefin for coating compositions has been dicyclopentadiene. Cycloocta-1,3-diene, cycloocta-1,5-diene, dipentene, limonene, methylcyclopentadiene dimer, styrene, myrcene, alloocimene, cyclododeca-1,5,9-triene, divinylbenzene, and 1,7-octadiene have all been reported as useful plasticizers for sulfur. All except styrene have two or more double bonds. See the following references:

B. R. Currell et al, cited above
T. A. Sullivan et al, Adv. Chem. Ser. 140, 55 (1975)
J. M. Dale, Mining Engineering, p. 19 (October 1973)
W. C. McBee and T. A. Sullivan, Sulfur Institute Journal, p. 12 (Fall-Winter, 1975)
M. D. Barnes in Beat Meyer, ed., Elemental Sulfur (Interscience Publishers, New York, 1965), p. 357.

The Currell et al reference in Advances in Chemistry Series 140, cited above, teaches that 1-octene and 2-octene were unsatisfactory to plasticize sulfur. Thus, Table II at page 7 of the Currell et al reference shows the use of several organic compounds to successfully modify sulfur as, for example, the use of dicyclopentadiene to obtain a flexible plasticized sulfur product. However, octene-1 and -2 are indicated as forming no reaction product with the sulfur. Reaction conditions used by Currell et al included heating at 140° C. for three hours elemental sulfur with the indicated added organic compound in an amount of the order of 20 weight percent as opposed to an amount contemplated herein not exceeding about 5 weight percent.

Sulfur compositions which have been disclosed as suitable for coating walls and concrete blocks include sulfur-dicyclopentadiene (see U.S. Pat. No. 3,823,019) and sulfur-organic polysulfides such as Thiokol LP-3 (see Barnes U.S. Pat. No. 3,306,000).

SUMMARY OF THE INVENTION

The present invention provides a plasticized sulfur composition having superior resistance to crazing and cracking when coated on a surface comprising at least 75 weight percent sulfur, a sulfur plasticizer wherein the plasticizer consists essentially of 0.2 to 5 weight percent of an essentially linear alpha-monoolefin of 6 to 14 carbon atoms, and 5 to 20 weight percent of a solid filler.

The present invention is based on the finding that an essentially linear alpha-monoolefin of 6 to 14 carbon atoms can be successfully reacted directly with molten sulfur to form a plasticized sulfur, which plasticized sulfur, when containing a solid filler, is particularly resistant to crazing or cracking when coated on a surface such as concrete and exposed to cyclic weather conditions and the like.

The temperature at which the sulfur is reacted with the monoolefin may be in the range 110°-240° C., but I have found that temperatures of 125°-200° C. are especially advantageous for forming the plasticized sulfur composition of the present invention.

By "essentially linear alpha-monoolefin" is meant a straight chain unsubstituted olefin having the unsaturated bond in the 1- or alpha-position. Also included in the term are alpha- or 1-olefins containing a low molecular weight alkyl substituent group such as methyl or ethyl, provided the substituent group does not appear on either unsaturated carbon, as illustrated by the compound 4-methyl-1-pentene. As mentioned, the olefins contemplated by the present invention are those containing 6 to 14 carbon atoms. Mixture of the olefins may also be used.

Specific examples are 1-hexane, 1-nonene, 1-undecene, 1-tetradecene. Examples of mixtures of olefins are equal proportions of 1-octene and of 1-decene. A mixture of approximately equal proportions of 1-octene, 1-nonene and 1-decene is especially suitable. The foregoing olefins and mixtures thereof are readily obtainable from the thermal cracking of waxes or from the ethylene growth reaction.

Of the linear monoolefins herein contemplated, I have found that those containing 8 to 10 carbon atoms are preferred, 1-decene gives especially advantageous results in terms of craze resistance for the plasticized sulfur composition.

It is often advantageous to use in combination with the alpha-olefin plasticizer of the present invention a second plasticizer which is an organic compound containing an acidic hydroxyl group. Examples of such auxiliary materials are unsaturated carboxylic acids, for example acrylic acid; phenolic compounds, substituted with sulfur, such as phenol polysulfides, i.e., phenol sulfur adducts as described for example in U.S. Pat. No. 4,026,719 to Simic. The auxiliary plasticizer may be used in amounts of 0.1 to 2, preferably 0.2 to 1 weight percent of the total composition.

Examples of the solid fillers included in the composition are mica, talc, asbestos, and/or glass fibers. Mica is especially advantageous for the plasticized sulfur composition of the present invention. The amount of the filler used preferably is 5 to 20 weight percent, more preferably 14 to 18 weight percent.

The term "sulfur plasticizer" is used herein to mean a substance that plasticizes sulfur or results in a plasticized sulfur. In turn, "plasticized sulfur" as the term is used herein are compositions comprising at least 75 weight percent sulfur which usually have a lower melting point than elemental sulfur. Furthermore, "plasticized sulfur" requires a longer time to crystallize; i.e., from the molten state the rate of crystallization is slower than that of elemental sulfur. One useful way to measure the rate of crystallization is as follows: The test material (0.040 g) is melted on a microscope slide at 130° C. and is then covered with a square microscope slide cover slip. The slide is transferred to a hot plate and is kept at a temperature of 78°±2° C., as measured on the glass slide using a surface pyrometer. One corner of the melt is seeded with a crystal of test material. The time required for complete crystallization is measured.

The present invention provides a method for obtaining a coated surface on concrete, brick, cement, stucco, plaster, earth, rock, metal and the like resistant to acid attack and cracking which comprises coating the surface with plasticized sulfur wherein the sulfur is plasticized with the $C_6$-$C_{14}$ alpha-monoolefin therein contemplated. I have found that such plasticized sulfur compositions are surprisingly craze resistant when used as coatings exposed to fluctuating temperature conditions. I found the monoolefins contemplated by the invention to be considerably superior to other similar hydrocarbons in terms of providing craze and crack resistance to coatings of plasticized sulfur. In forming the aforesaid coated surfaces the plasticized sulfur composition is applied while molten, preferably at a temperature of 105° to 150° C.

In addition to the method for obtaining a coating using sulfur plasticized with the $C_6$-$C_{14}$ monoolefin, the present invention also embraces these materials as coating composition per se.

The composition can be applied by spraying, rolling or brushing onto the surface, preferably by spraying. Preferably, the composition is applied to a thickness of 1/32 to ¾ inch, more preferably 1/16 to ⅜ inch.

EXAMPLES

To molten sulfur stirred in a three-neck round-bottom flask with reflux condenser was added one of the olefins listed in Table I. Olefins boiling below about 120° C. were added in small portions about as rapidly as the hydrocarbon reacted, heat input being sufficient to maintain the sulfur just above the melting point (i.e., about 125° C.). Olefins boiling above 120° C. were added all at once and the resulting mixture was heated in a 150° C. oil bath. When reflux had subsided, or, if there was no reflux, when the olefin layer had disappeared, acidic hydroxyl compounds were added if desired and the molten composition was maintained at about 145° C. for about 1 hour. Mica was added and the mixture maintained again at about 145° C. for about 1 hour. An exception to the above procedure was camphene, since it had earlier been found that improved results were obtained with camphene if before the addition of mica the composition was heated to 180° C. for 2 hours followed by 2 hours at 150° C.

The molten composition was then poured to a depth of ¼ inch on a 5-inch by 5½-inch concrete block. This block was obtained by sawing a commercial 6-2-16 light-weight concrete block cap into three equal parts which were then washed, dried at 140° F., and stored at room temperature in air.

The morning after the composition was poured, its surface was examined using a 7-power, lighted magnifying glass. It was regarded as having failed if any crack could be observed sufficiently distinctly that the gap between the two surfaces ws undeniable. Fine cracks could barely be distinguished by the naked eye upon knowing where to look. The block was also regarded as having failed if (1) a gap at least 0.5 mm wide appeared between the sulfur and the concrete along at least one entire side, so that it was visually apparent that a substantial portion of the sulfur was no longer in contact with the concrete, or (2) the coating could be pulled off manually by grasping the coating with the fingers of one hand and the block with the other hand.

If no failure occurred following pouring, the blocks were subjected to thermocycling by placing them in an environmental chamber at 70° C. for eight hours. The chamber was then cooled to 30° C. and the specimens left therein overnight, i.e., for about 16 hours (first cycle). The next morning, the blocks were inspected and placed in the chamber again at 70° C. for eight hours, the chamber being then cooled to 25° C. and left overnight at this temperature (second cycle).

In accordance with the test the cooling stage is lowered by 5° C. in each cycle, until a −40° C. temperature is reached. Thereafter, a cycle consists, subject as always to inspection, in placing the blocks in the environmental chamber at 70° C. for eight hours and then cooling to −40° C. for 16 hours, i.e. overnight. Before inspection, cold blocks were allowed to stand at room temperature until the frost on their surfaces had melted.

In the foregoing accelerated test a composition lasting 15 or more cycles before failure is considered satisfactory.

Table I lists the results obtained, the cycle numbers to failure referring to results obtained on separate blocks. The values followed by a plus indicate tests that were terminated without failure at the specified number of cycles.

TABLE I

CRAZING, CRACKING AND ADHESION TESTS

| No. | Sulfur | Filler | Olefin | No. of Cycles To Failure |
|---|---|---|---|---|
| 1 | 85 | Mica, 14 | 1-Hexene, 1 | 23, 23 |
| 2 | 85 | Mica, 14 | 1-Octene, 1 | 15, 15, 17 |
| 3 | 84 | Mica, 14 | 1-Octene, 2 | 20+, 20+, 20+ |
| 4 | 82 | Mica, 14 | 1-Octene, 4 | 20, 20, 20 |
| 5 | 78 | Mica, 14 | 1-Octene, 8 | Too soft to test |
| 6 | 81 | Mica, 18 | 1-Octene, 1 | 15, 15+ |
| 7 | 85 | Mica, 14 | 1-Decene, 1 | 23, 23, 25 |
| 8 | 81 | Mica, 18 | 1-Decene, 1 | 15, 15+ |
| 9 | 85 | Mica, 14 | 1-Tetradecene,[1] 1 | 20+, 20+, 20+ |
| 10 | 85 | Mica, 14 | Camphene, 1 | 10, 10, 15 |
| 11 | 81 | Mica, 18 | Camphene, 1 | 2, 4 |
| 12 | 85 | Mica, 14 | Diisobutylene, 1 | Incompatible |
| 13 | 85 | Mica, 14 | 4-methyl-1-pentene, 1 | 15, 19 |
| 14 | 85 | Mica, 14 | 2-methyl-2-pentene, 1 | 10, 10 |
| 15 | 85 | Mica, 14 | 2-ethyl-1-hexene, 1 | 8, 10, 15 |
| 16 | 85 | Mica, 14 | 4-methyl-1-cyclohexene, 1 | 17, 17 |
| 17 | 85 | Mica, 14 | 1-methyl-1-cyclohexene, 1 | 10, 23 |
| 18 | 85 | Mica, 14 | trans-4-octene, 1 | 12, 14, 14 |
| 19 | 84 | Mica, 14 | 1-Decene/PSA[2], 1/1 | 30, 30, 33 |
| 20 | 85 | Mica, 14 | 1-Decene/Acrylic Acid, 1/0.2 | 17, 17, 19 |
| 21 | 84 | Mica, 14 | 1-Decene/o-Allylphenol, 1/1 | 17, 17, 19 |
| 22 | 85 | Mica, 14 | 1-Decene/Maleic Anhyd., 1/0.2 | [3] |
| 23 | 85 | Mica, 14 | 1-Decene/Tetrahydrophthalic Anhydride, 1/0.2 | [4] |

[1]Somewhat incompatible, pimply surface
[2]PSA is a phenol-sulfur adduct sulfur plasticizer prepared by reacting phenol with sulfur (See, e.g. U.S. Pat. No. 4,026,719)
[3] Product is too thick to pour
[4] The anhydride did not completely dissolve even after 20 hours at 150° C.

What is claimed is:

1. A plasticized sulfur composition, having superior resistance to crazing and cracking when coated on a surface, consisting essentially of at least 75 weight percent sulfur, 5 to 20 weight percent of a solid filler; and from 0.2 to 5 weight percent of a sulfur plasticizing compound selected from group consisting of esentially linear alpha-monoolefin having 6 to 14 carbon atoms and mixtures thereof.

2. A composition in accordance with claim 1 wherein the plasticizer is essentially a linear alpha-monoolefin having 8 to 10 carbon atoms.

3. A composition in accordance with claim 1 wherein the monoolefin is 1-decene.

4. A composition in accordance with claim 1 wherein the sulfur is reacted with the monoolefin at a temperature between 125° and 200° C.

5. A composition in accordance with claim 1 wherein the solid filler is mica.

6. A composition in accordance with claim 5 wherein the mica is present in an amount of 14 to 18 weight percent.

7. A plasticized sulfur composition, having superior resistance to crazing and cracking when coated on a surface, consisting essentially of at least 75 weight percent sulfur; 5 to 20 weight percent of a solid filler; 0.2 to 5 weight percent of a sulfur plasticizer selected from the group consisting of an essentially linear alpha-monoolefin having 6 to 14 carbon atoms and mixtures thereof and from 0.1 to 2 weight percent of an auxiliary sulfur plasticizer selected from the group consisting of organic compounds having an acidic hydroxyl group and mixtures thereof.

8. A composition according to claim 7 wherein the organic compound containing an acidic hydroxyl group is acrylic acid or phenol sulfur adduct used in an amount of 0.1 to 1 weight percent of the total composition.

9. The composition of claim 7 wherein said filler is mica.

10. The composition of claim 7 wherein said alpha-monoolefin is 1-decene and said organic compound is a phenolic-sulfur adduct.

* * * * *